US009593532B2

(12) United States Patent
Dehoff et al.

(10) Patent No.: US 9,593,532 B2
(45) Date of Patent: Mar. 14, 2017

(54) LADDER MOUNTING AND RETAINING SYSTEM

(71) Applicants: Clifford B. Dehoff, Southampton, NJ (US); John M. Morris, Shamong, NJ (US)

(72) Inventors: Clifford B. Dehoff, Southampton, NJ (US); John M. Morris, Shamong, NJ (US)

( * ) Notice: Subject to any disclaimer, the term of this patent is extended or adjusted under 35 U.S.C. 154(b) by 183 days.

(21) Appl. No.: 14/600,211

(22) Filed: Jan. 20, 2015

(65) Prior Publication Data

US 2016/0208555 A1 Jul. 21, 2016

(51) Int. Cl.
*F16M 13/00* (2006.01)
*E06C 7/48* (2006.01)

(52) U.S. Cl.
CPC .................................... *E06C 7/48* (2013.01)

(58) Field of Classification Search
USPC .................................................... 248/354.3
See application file for complete search history.

(56) References Cited

U.S. PATENT DOCUMENTS 1,470,489 A * 10/1923 Schuh .................... E06C 1/345 182/206
2,432,781 A * 12/1947 Mann ...................... E06C 1/345 182/206
2,556,998 A * 6/1951 Frazier .................... E06C 1/345 182/206
2,788,930 A * 4/1957 Pals .......................... E06C 7/48 182/21
2,856,112 A * 10/1958 Broderick .............. E06C 1/345 182/117
2,903,086 A * 9/1959 Chubbs ..................... E06C 7/48 182/229
4,184,569 A * 1/1980 Grenier ................... E06C 7/488 182/206
4,218,156 A * 8/1980 Logan ....................... F16B 7/06 403/320
4,279,327 A * 7/1981 Warren ................... E06C 1/345 182/152
4,394,887 A * 7/1983 Spinks ...................... E06C 7/48 182/107
4,444,291 A * 4/1984 McPherson ............. E06C 7/486 182/107
4,678,061 A * 7/1987 Jordan .................... E06C 1/345 182/107
4,787,478 A * 11/1988 Stakes, Jr. .............. E06C 7/488 182/107

(Continued)

*Primary Examiner* — Monica Millner
(74) *Attorney, Agent, or Firm* — Stuart M. Goldstein

(57) ABSTRACT

A ladder mounting and retaining system for use on building parapets utilizes a parapet support member secured to the parapet of a building, a ladder support member for retaining the sides of the lengths of a ladder, and a connecting member in the form of a threaded rod, interconnecting the parapet support member and the ladder support member for maintaining these members at a given distance from each other. The parapet support member is secured in position by locking nuts threaded around the connecting member and the ladder support member is secured over the outboard edge of the parapet by retention members. Ladder supports are adjustable on the ladder support member to accommodate ladders of different widths.

20 Claims, 3 Drawing Sheets

(56) References Cited

U.S. PATENT DOCUMENTS

| | | | | | |
|---|---|---|---|---|---|
| 5,261,507 | A * | 11/1993 | Williams | E06C 7/48 | 182/214 |
| 5,899,296 | A * | 5/1999 | Lantz | E06C 7/48 | 182/107 |
| 6,382,353 | B2 * | 5/2002 | Laug | E06C 7/48 | 182/107 |
| 6,913,114 | B1 * | 7/2005 | Blehm | E04D 15/00 | 182/104 |
| 7,185,739 | B1 * | 3/2007 | Blehm | E06C 1/345 | 182/107 |
| 7,789,199 | B2 * | 9/2010 | Wollenberg | E06C 7/48 | 182/201 |
| 7,984,887 | B1 * | 7/2011 | Visser | E06C 5/32 | 182/129 |
| 2002/0014042 | A1 * | 2/2002 | Price | E04G 3/34 | 52/127.2 |
| 2002/0134619 | A1 * | 9/2002 | Schwenke | E06C 1/34 | 182/107 |
| 2006/0054390 | A1 * | 3/2006 | Ray | E06C 7/486 | 182/107 |
| 2012/0175188 | A1 * | 7/2012 | Xu | E06C 7/44 | 182/107 |
| 2014/0008150 | A1 * | 1/2014 | Baglin | E06C 7/488 | 182/129 |
| 2015/0129356 | A1 * | 5/2015 | Strawder | A62B 35/0068 | 182/3 |

* cited by examiner

LADDER MOUNTING AND RETAINING SYSTEM

BACKGROUND OF THE INVENTION

Falls from ladders propped up against roofs or other upper reaches of buildings result in thousands of injuries a year. Many of these type accidents are caused by ladders which are not positioned safely and which then slip, slide, or tip, resulting in the worker on the ladder to fall and, often times, sustain serious bodily harm.

Numerous ladder to building securing and stabilizing systems have been proposed, some which have had greater success than others. However, there have been no such systems particularly directed to safely positioning and retaining a propped ladder to the parapet of a building. Since many buildings, especially those which are industrial and commercial in nature, have parapets on their roofs, a ladder retaining system for these buildings would constitute an important step in worker safety.

SUMMARY OF THE INVENTION

It is thus the object of the present invention to provide a ladder mounting and retaining system specifically designed for a building parapet.

It is another object of the present invention to provide a ladder mounting and retaining system which safely and securely retains a propped ladder adjacent to a parapet.

It is still another object of the present invention to provide a ladder mounting and retaining system which is easily installed on the parapet and ladder.

It is a further object of the present invention to provide a ladder mounting and retaining system which is readily adjustable for use on parapets of different widths.

It is another object of the present invention to provide a ladder mounting and retaining system which is also readily adjustable for use with ladders of varying widths.

These and other objects are accomplished by the present invention, a ladder mounting and retaining system for use on building parapets which utilizes a parapet support member secured to the parapet of a building, a ladder support member for retaining the sides of the lengths of a ladder, and a connecting member in the form of a threaded rod, interconnecting the parapet support member and the ladder support member for maintaining these members at a given distance from each other. The parapet support member is secured in position by locking nuts threaded around the connecting member and the ladder support member is secured over the outboard edge of the parapet by retention members. Ladder supports are adjustable on the ladder support member to accommodate ladders of different widths.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
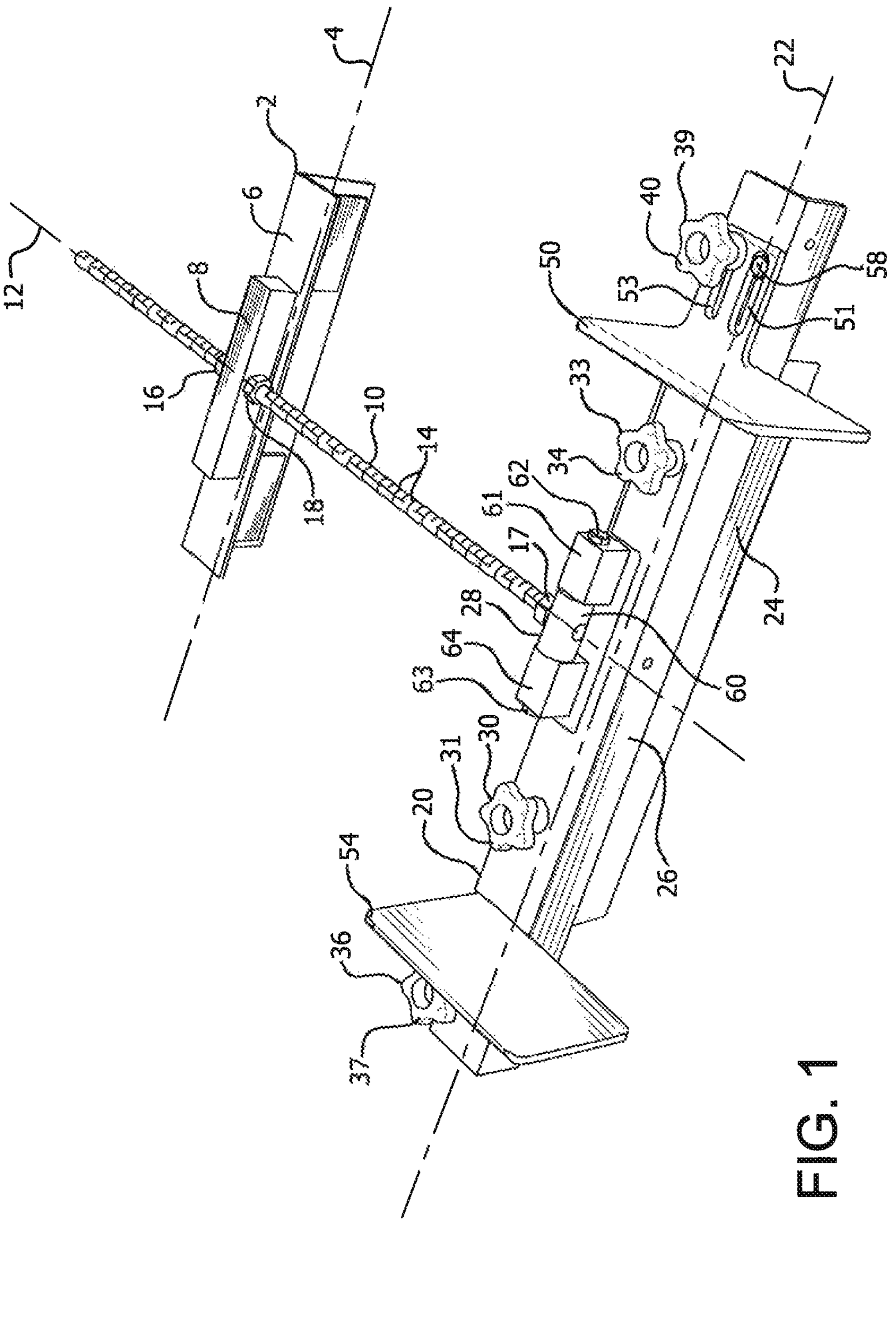
FIG. 1 is a perspective view of the ladder mounting and retaining system of the present invention.

The ladder mounting and retaining system of the present invention comprises parapet support member 2 having longitudinal axis 4, ladder support member 20 having longitudinal axis 22, and connecting member 10, having longitudinal axis 12, extending between the parapet support member and the ladder support member. Connecting member 10 is optimally a rod element having threads 14 extending the length of the rod element. Threads 14 comprise adjustment means for varying the distances between parapet support member 2 and ladder support member 20, once these members are positioned on a parapet.

Figure 2:
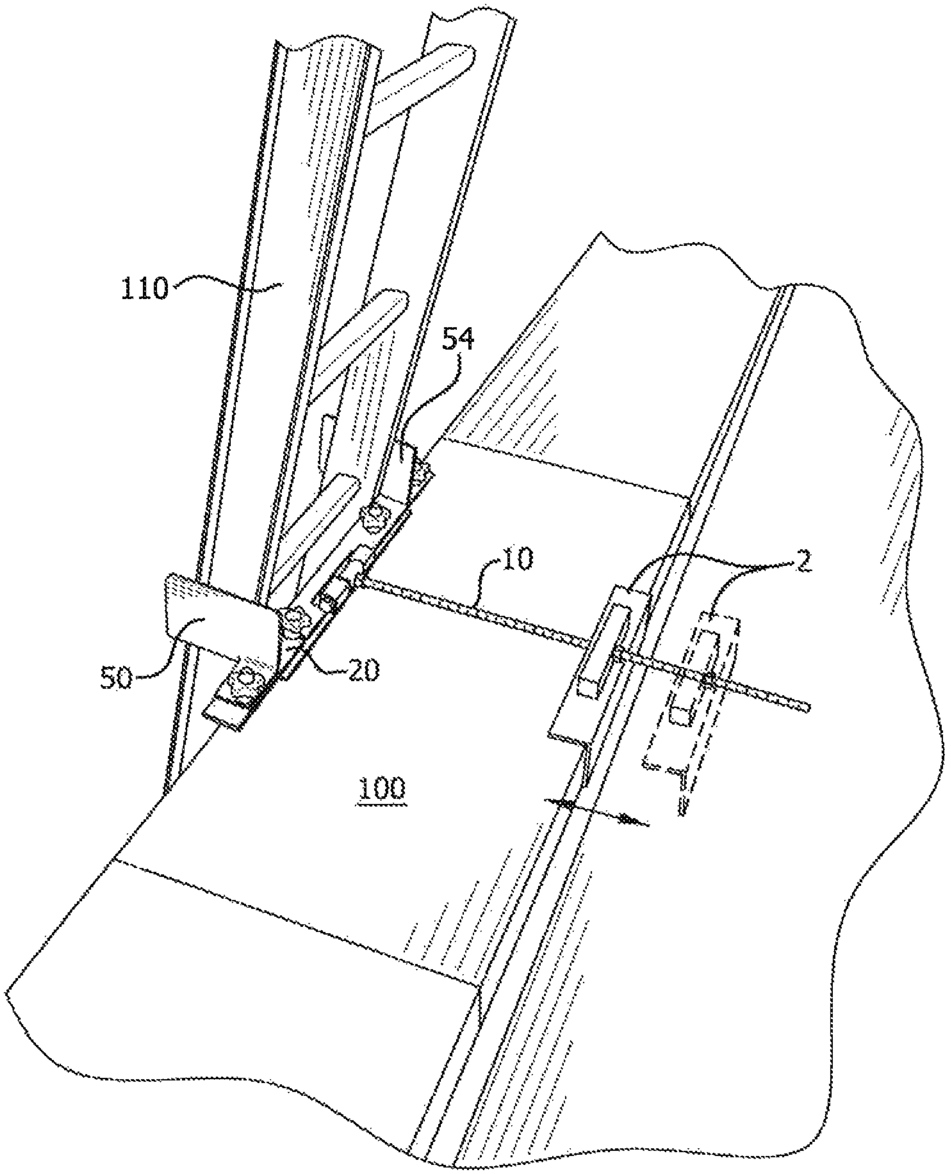
FIG. 2 depicts the system of the present invention in use against a building parapet.

Parapet support member 2, configured to overlay the inboard side of a parapet 100, as seen in FIG. 2, comprises lower section 6 and upper section 8. Upper section 8 has an opening through which connecting member 10 extends. By this configuration, parapet support member 2 is slideable along connecting member 10, in order to vary the distance between the parapet support member and ladder support member 20, thereby accommodating parapets of varying widths. Connecting member 10 extends between parapet support member 2 and ladder support member 20 for maintaining these members at a pre-determined distance from each other.

Locking means, in the form of nut members 16 and 18, threadably engage threads 14 along connecting member 10. Tightening nut members 16 and 18 against upper section 8 of parapet support member 2, serves to secure parapet support member 2 and ladder support member 20 at the requisite, pre-determined distance to accommodate parapets of any given width.

Ladder support member 20, configured to overlay the outboard side of parapet 100, comprises lower section 24 and upper section 26. Connecting member 10 extends into top support 28 on lower section 24 and is secured to the lower section by tightening nut member 17, threaded onto connecting member 10, against the top support.

Top section 28 comprises round, threaded, rotatable cylinder 60 which is located between block members 61 and 64 positioned on lower section 24. Block members 61 and 64 have channels extending therethrough. Bolts 62 and 63 extend through block members 61 and 64 and are threadably engaged within cylinder 60. This configuration allows cylinder 60 to rotate, providing the means to permit angular adjustment of connecting member 10 and parapet support member 2, in relation to ladder support member 20, in the event the inboard and outboard top edges of the parapet are not level or the top parapet surface is sloped. By allowing for the rotation of cylinder 60, parapet support member 2 and ladder support member 20 can be set so as to be as level as possible, in order to maintain a greater surface to surface contact where the support members meet the parapet surfaces.

Upper section 26 accommodates commonly used handled threaded retention members 30, 33, 36 and 39. The retention members each comprise upper handles 31, 34, 37 and 40 for manual rotation, each handle being connected to the threaded stems 32, 35, 38 and 41 extending down from the handles.

Stems 32 and 35 of retention members 30 and 33 extend through threaded openings 42 and 44 through upper section 26. Retention embers 30 and 33 are rotated so as to be tightened within openings 42 and 44 and against the top surface of lower section 24 to assist in rigidly maintaining upper section 26 on the lower section.

Figure 3:
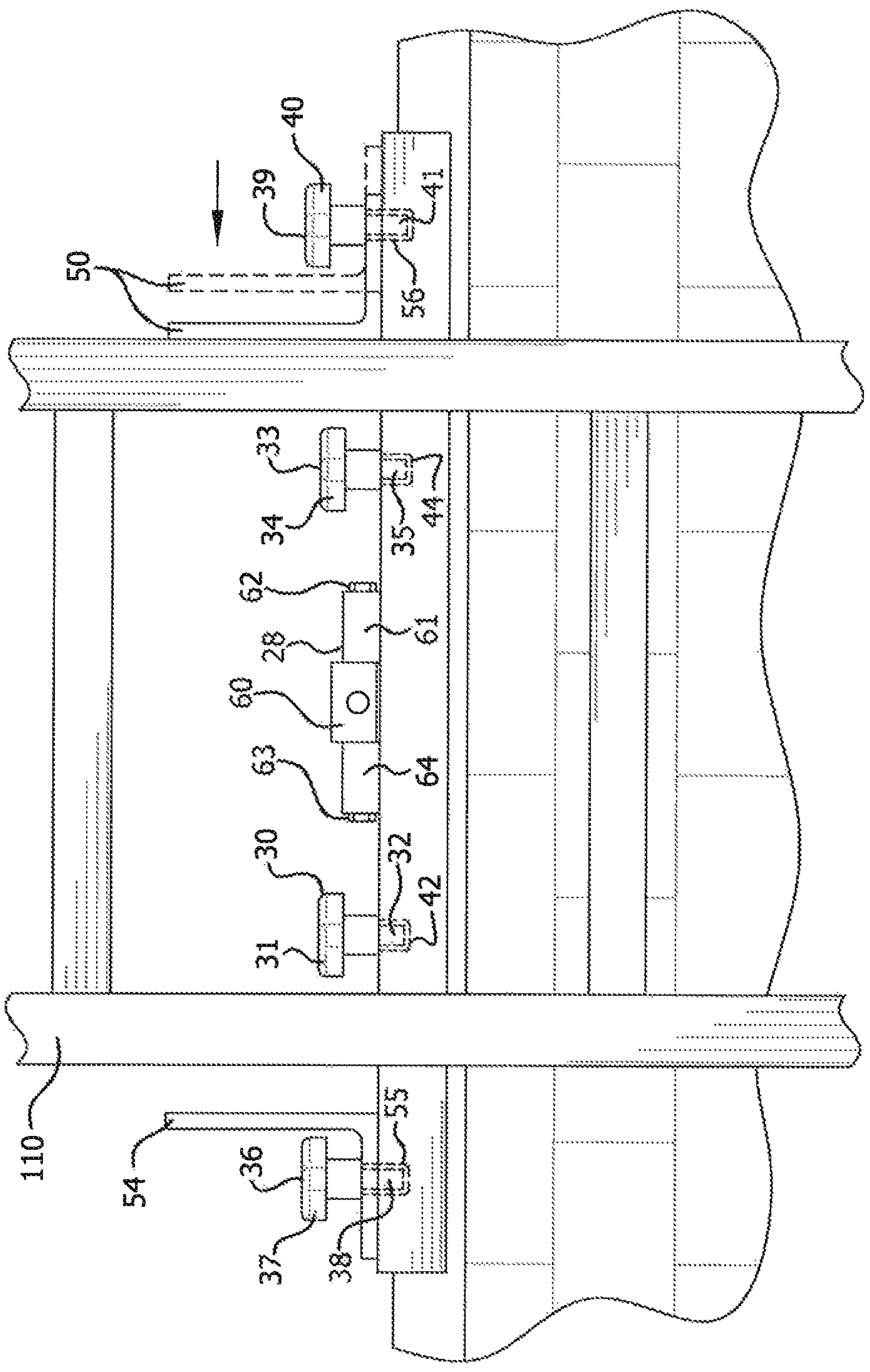
FIG. 3 is a partial elevation view showing the manner a ladder is retained by the system of the present invention.

Ladder supports 50 and 54 overlay the top surface and at both ends of upper section 26. Ladder supports 50 and 54 each comprise two elongated slots, each slot located over a threaded end opening through upper section 26. Elongated slots 51 and 53 through ladder support 50 are shown in FIG. 1. It can be appreciated that two similar slots are provided in ladder support 54. A threaded end opening is located through upper support 26, beneath each of the slots. Two of these thread openings 55 and 56, are depicted in FIG. 3, but it can be appreciated that threaded end openings are also located beneath the other two slots.

Guide bolt 58 is located within slot 51 of ladder support 50 and a threaded end opening through upper section 26. See FIG. 1. An identical guide bolt is located within the slot of ladder support 54 and the threaded end opening at the opposite end of upper section 26. Stems 38 and 41 of retention members 36 and 39 extend into threaded openings 55 and 56. By this configuration, ladder supports 50 and 54 are positioned on and slideable along upper support 26, to be positioned against the sides of ladder 110. Tightening retention members 36 and 39 within threaded openings 55 and 56 secures ladder supports 50 and 54 in this position to rigidly maintain ladder 110 between the ladder supports. By loosening retention members 36 and 39, the position of ladder supports 50 and 54 can be moved along upper section 26 to accommodate ladders of most any width.

In this manner, the ladder mounting and retaining system of the present invention, rigidly and safely secures a ladder to rooftop parapets of varying size.

The system has additional versatility in that it can be used for the retention of ladders to the sides of buildings having no parapets. By loosening retention members 30 and 33, upper section 26 is removed from lower member 24. Upper section 26 is then free to be used independently of the remaining components of ladder support member 20 and parapet support member 2, against any building, with its ladder width size adjustment capability in tact.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A system for maintaining and securing a ladder onto a parapet on the roof of a building, the system comprising:

a parapet having a top surface and inboard and outboard sides, the parapet being located on and along an edge of the roof;

a parapet support member having a longitudinal axis, said parapet support member overlaying the inboard side of the parapet located on and along the edge of the roof;

a ladder support member overlaying the outboard side of the parapet located on and along the edge of the roof, said ladder support member having a longitudinal axis and ladder support means positioned thereon for rigidly securing the ladder adjacent the ladder support member;

a connecting member having a longitudinal axis, said connecting member extending over the top surface of the parapet located on and along the edge of the roof and between the parapet support member and the ladder support member for maintaining said members at a pre-determined distance from each other; and locking means for removeably securing the parapet support member and the ladder support member to the parapet and at said pre-determined distance from each other.

2. The system as in claim 1 wherein the locking means comprises at least one threaded nut member threadably engaged around the connecting member and adjacent to the parapet support member.

3. The system as in claim 1 wherein the locking means comprises two threaded nut members threadably engaged around the connecting member and adjacent to the parapet support member.

4. The system as in claim 1 further comprising adjustment means for varying the distance between the parapet support member and the ladder support member.

5. The system as in claim 4 wherein the adjustment means comprises threads which circumscribe the connecting member.

6. The system as in claim 5 wherein the locking means comprises at least one threaded nut member, threadably engaged around the threads which circumscribe the connecting member.

7. The system as in claim 6 wherein the longitudinal axis of the parapet support member and the ladder support member are parallel to each other and are perpendicular to the longitudinal axis of the connecting member when the parapet support member and the ladder support member are positioned over the parapet.

8. The system as in claim 7 wherein the parapet support member is slideable along the connecting member.

9. The system as in claim 1 wherein the locking means comprises a nut member threadably engaged around the connecting member and adjacent to the ladder support member.

10. The system as in claim 2 wherein the locking means further comprises a second nut member threadably engaged around the connecting member and adjacent to the ladder support member.

11. The system as in claim 3 wherein the locking means further comprises a third nut member threadably engaged around the connecting member and adjacent to the ladder support member.

12. The system as in claim 11 wherein the longitudinal axis of the parapet support member and the ladder support member are parallel to each other and are perpendicular to the longitudinal axis of the connecting member when the parapet support member and the ladder support member are positioned over the parapet.

13. The system as in claim 1 wherein the connecting member comprises a threaded rod.

14. The system as in claim 1 in which the ladder support means further comprises adjustable ladder supports for the retention of ladders of varying sizes.

15. The system as in claim 1 further comprising means for angular adjustment between the connected member and the ladder support member.

16. The system as in claim 15 wherein the means for angular adjustment comprises a rotatable cylinder mounted on the ladder support member.

17. A system for maintaining and securing a ladder onto a parapet on the roof of a building, the system comprising:

a parapet having a top surface and inboard and outboard sides, the parapet being located on and along an edge of the roof;

a parapet support member having a longitudinal axis, said parapet support member overlaying the inboard side of the parapet located on and along the edge of the roof;

a ladder support member overlaying the outboard side of the parapet located on and along the edge of the roof, said ladder support member having longitudinal axis and ladder support means positioned thereon for rigidly securing the ladder adjacent to the ladder support member;

a connecting member having a longitudinal axis, said connecting member extending over the top surface of the parapet located on and along the edge of the roof and between the parapet support member and the ladder support member for maintaining said members at a pre-determined distance from each other, wherein the longitudinal axis of the parapet support member and the longitudinal axis of the ladder support member are parallel to each other and are perpendicular to the longitudinal axis of the connecting member when the parapet support member and the ladder support member are positioned over the parapet; and locking means for removeably securing the parapet support member and the ladder support member to the parapet and at said pre-determined distance from each other.

18. A system for maintaining and securing a ladder onto a parapet on the roof of a building, the system comprising:

a parapet having a top surface and inboard and outboard sides, the parapet being located on and along an edge of the roof;

a parapet support member having a longitudinal axis, said parapet support member overlaying the inboard side of the parapet located on and along the edge of the roof;

a ladder support member overlaying the outboard edge of the parapet, said ladder support member having ladder support means positioned thereon for rigidly securing the ladder adjacent to the ladder support member;

a connecting member having a longitudinal axis, said connecting member extending over the top surface of the parapet located on and along the edge of the roof and between the parapet support member and the ladder support member for maintaining said members at a pre-determined distance from each other, and wherein the parapet support member is slideable along the connecting member; and locking means for removeably securing the parapet support member and the ladder support member to the parapet at said pre-determined distance from each other.

19. The system as in claim 4 where the longitudinal axis of the parapet support member and the longitudinal axis of the ladder support member are parallel to each other and are perpendicular to the longitudinal axis of the connecting member when the parapet support member and the ladder support member are positioned over the parapet.

20. The system as in claim 17 wherein the parapet support member is slideable along the connecting member.

* * * * *